No. 749,177. PATENTED JAN. 12, 1904.
D. E. FELT.
CALCULATING MACHINE.
APPLICATION FILED SEPT. 12, 1902.
NO MODEL. 9 SHEETS—SHEET 1.

Fig. 1

Witnesses:
Wm. Geiger
H. W. Munday

Inventor:
Dorr E. Felt
By Munday, Evarts & Adcock.
Attorneys

No. 749,177. PATENTED JAN. 12, 1904.
D. E. FELT.
CALCULATING MACHINE.
APPLICATION FILED SEPT. 12, 1902.
NO MODEL. 9 SHEETS—SHEET 2.

Fig. 2

Witnesses:
Wm. Geiger
S. W. Munday

Inventor:
Dorr E. Felt
By Munday, Evarts & Adcock.
Attorneys

No. 749,177.  
PATENTED JAN. 12, 1904.

D. E. FELT.  
CALCULATING MACHINE.  
APPLICATION FILED SEPT. 12, 1902.

NO MODEL.  
9 SHEETS—SHEET 3.

Witnesses:  
Wm. Geiger  
N. W. Munday

Inventor  
Dorr E. Felt  
By Munday, Evarts & Adcock  
Attorneys

No. 749,177. PATENTED JAN. 12, 1904.
D. E. FELT.
CALCULATING MACHINE.
APPLICATION FILED SEPT. 12, 1902.
NO MODEL. 9 SHEETS—SHEET 4.

Witnesses:
Wm. Geiger
H. W. Munday

Inventor:
Dorr E. Felt
By Munday, Evarts & Adcock
Attorneys

No. 749,177. PATENTED JAN. 12, 1904.
D. E. FELT.
CALCULATING MACHINE.
APPLICATION FILED SEPT. 12, 1902.
NO MODEL. 9 SHEETS—SHEET 5.

Fig. 8

Witnesses:
Wm. Geiger
H. M. Munday

Inventor:
Dorr E. Felt
By Munday, Evarts & Adcock.
Attorneys

No. 749,177. PATENTED JAN. 12, 1904.
D. E. FELT.
CALCULATING MACHINE.
APPLICATION FILED SEPT. 12, 1902.
NO MODEL. 9 SHEETS—SHEET 6.

Fig. 9

Witnesses:
Wm. Geiger
H. W. Munday

Inventor:
Dorr E. Felt
By Munday, Evarts & Adcock
Attorneys

No. 749,177. PATENTED JAN. 12, 1904.
D. E. FELT.
CALCULATING MACHINE.
APPLICATION FILED SEPT. 12, 1902.
NO MODEL. 9 SHEETS—SHEET 7.

Witnesses:
Wm. Geiger
H. W. Munday

Inventor:
Dorr E. Felt
By Munday, Evarts & Adcock.
Attorneys

No. 749,177. PATENTED JAN. 12, 1904.
D. E. FELT.
CALCULATING MACHINE.
APPLICATION FILED SEPT. 12, 1902.
NO MODEL. 9 SHEETS—SHEET 8.

Witnesses:
Wm. Geiger
H. W. Munday

Inventor:
Dorr E. Felt
By Munday, Evarts & Adcock.
Attorneys

No. 749,177. PATENTED JAN. 12, 1904.
D. E. FELT.
CALCULATING MACHINE.
APPLICATION FILED SEPT. 12, 1902.
NO MODEL. 9 SHEETS—SHEET 9.

Witnesses:
Wm. Guger
H. W. Munday

Inventor:
Dorr E. Felt
By Munday, Evarts & Adcock.
Attorneys

No. 749,177. Patented January 12, 1904.

UNITED STATES PATENT OFFICE.

DORR E. FELT, OF CHICAGO, ILLINOIS, ASSIGNOR TO COMPTOGRAPH COMPANY, OF CHICAGO, ILLINOIS, A CORPORATION OF ILLINOIS.

CALCULATING-MACHINE.

SPECIFICATION forming part of Letters Patent No. 749,177, dated January 12, 1904.

Application filed September 12, 1902. Serial No. 123,085. (No model.)

*To all whom it may concern:*

Be it known that I, DORR E. FELT, a citizen of the United States, residing in Chicago, in the county of Cook and State of Illinois, have invented a new and useful Improvement in Calculating-Machines, of which the following is a specification.

One of the chief difficulties in the manufacture of adding-machines where several series of different denominational keys are employed to set other devices in position for operating the registering mechanism has been the difficulty of adjusting the parts so that they will work accurately in the practical operation of the machine in proper timing and in proper amount of throw and relation for all positions. In the present machine I entirely overcome this difficulty by employing a notched arm for each denomination, which is mounted yieldingly on its actuating-shaft and is connected by a link or lever to the segmental lever, by which the corresponding numeral-wheel is actuated, and by another link to the locking lever or device for locking the numeral-wheel. By this simple means the variable throw of the segment-lever will always be the same for each variation, the variations being produced by the link connecting said segment-lever with the notched arm and the amount of movement being determined by the particular notch engaged and any overthrow or too great motion of the actuating-shaft being compensated for by the spring-power which holds the notched arm to the actuating-shaft.

Another principal object had in view has been to avoid the loss of alinement in the printing through the springing of the segment-levers under the strains put upon them in the practical operation of the machine. In prior constructions the power for operating the segment-levers was applied thereto at different points, depending upon the value of the key whose figure was to be registered and printed. In some cases the power was applied to the end of the levers near their pivot, in others to the end farthest away from the pivot, and in others near the center, so that there was considerable liability in some cases to spring and in others no such liability at all. This evil is overcome by applying the power in all the operations to the same point upon each of the levers, whereby the springing of the levers, if there is any, becomes a fixed quantity, capable of being determined and provided for and rendering unnecessary any loss of alinement by reason of it.

My invention also contemplates other improvements in the construction of the machine whereby new results are obtained, and all the details thereof—those relating to the key mechanism as well as those relating to other features of improvement—are fully set forth below and are also illustrated in the accompanying drawings, in which—

Fig. 13 is an enlarged partial cross-section. Fig. 14 is an elevation, and Fig. 15 an end view, of the sliding bar actuated by the keys; and Fig. 16 is an elevation of the notched graduated bar through which the action of the segment-levers is regulated in the normal printing operations.

My machine embodies any desired number of denominations, and in each denomination are nine digital keys (shown at 20) arranged in rows extending backward from the front of the machine and best shown at Figs. 8, 9, 10, 11, and 13. The stems of these keys extend downward between pairs of guide plates or devices 21 and 22 and are preferably reduced in size below their longitudinal centers in order to form shoulders 23, which will serve as abutments to the lifting-springs 24, with one of which each key is provided and which rest on the plates 22. The lower end of each key is bent at right angles, as shown at 25, and the bent end normally engages the plate 22 and limits the upward movement of the key, as plainly shown at Fig. 13. The plates 21 and 22 are made in sections, each section extending lengthwise of the rows of keys and laterally from the center of one denominational row to the center of the next adjacent row and are suitably secured at their ends. The corresponding parts 21 and 22 of each section are preferably integral, being united at their ends 26 and also at intermediate points by posts 27, so that they form strong rigid frames, and as the keys are positioned between adjacent frames the former are easily taken out for repairs, since the frames can be readily removed.

Figure 17:
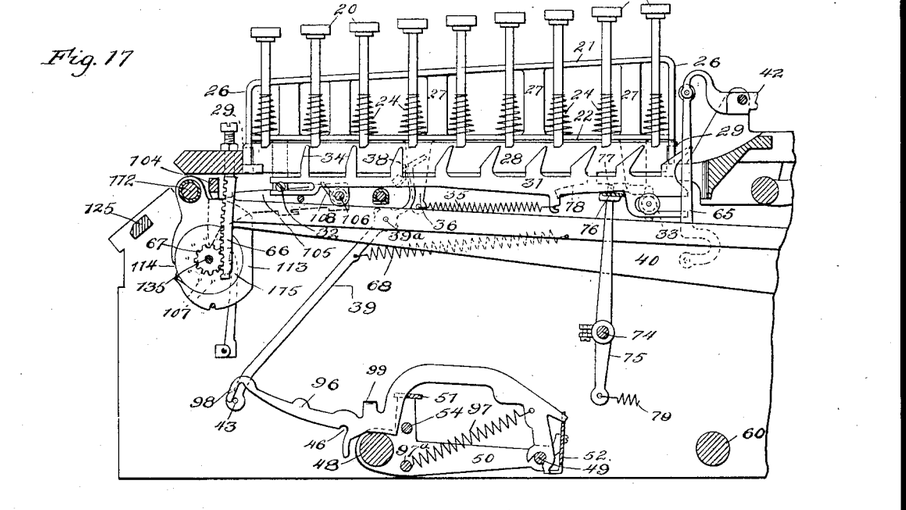
Fig. 17 is a central vertical section, showing the mechanism set for answer-printing.

Below each frame member 22 is a key-locking plate 28, shown in the same figures, extending longitudinally of and in close proximity to the row of keys and hinged at its ends in the ends 26 of the frames, as at 29, Fig. 17, so that the plate may be swung laterally by the keys when the latter are depressed, the springs 30 at each end of the plate constantly pressing it toward the keys. The keys descend far enough to carry their bent ends below the bottom of the plate, and as soon as they reach that position the plate is swung back by springs 30 and into position where its bottom is in locking engagement with the bent ends, so that the keys are held against returning to normal position. Each key when thus operated not only becomes locked, as above stated, but by its swinging of the plate it also causes the release of any other key which may at the time be in locking engagement with the plate. When locked in the depressed position, the keys remain under the control of plate 28 until released either by the operation of the printing-lever, which causes the release of all the depressed keys, Figs. 8, 9, 10, 12, and 17, or until it is released by the striking of another key in the same denomination or by the operation of the releasing-lever, as hereinafter set forth. The keys have no other or further movement than that above described.

Figures 13, 14, 15, 16:
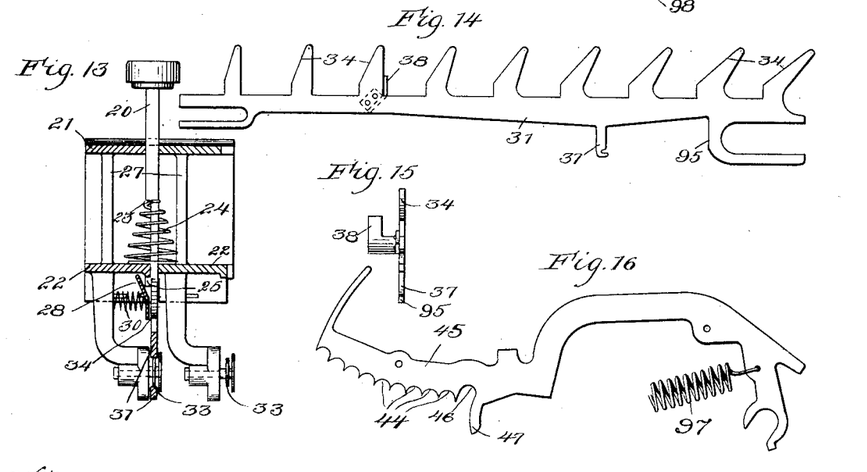

Directly below each denominational row of keys is a bar 31, (shown in detail at Fig. 14 and also shown in Figs. 8 to 11, 13 and 17,) having freedom to move longitudinally. It is desirably made to slide and is supported at one end on the pin 32 and at the other end on the dolly-roll 33. This bar is provided with nine inclines or cams 34, one below each key embraced in the denomination, and the inclines are graduated in length, according to the power of the keys under which they are located. Thus the incline of the "9" key is long, that under the "8" key somewhat shorter, and so on down, gradually diminishing in length to the incline under the units-key, which is quite short. The inclines are located directly under the respective keys, so that when the latter are struck, as already described, they come against the inclines and give longitudinal motion to the bar for a distance corresponding to the length of the incline. The variable and graduated movements of the bar 31 received from the keys through the medium of the inclines determine the action of the adding and printing mechanism, as will be understood later on. The bars are returned to their normal positions by springs 35, which are attached to legs 36 on the frame members 22 and to legs 37 on the bars, but are detained in the changed positions by the keys as long as the latter remain depressed. Attached to each bar is a laterally-projecting wing 38, Figs. 14 and 15, which at each impulse given the bar by a key comes against the upper end of a movable and variably-acting link 39. This link is attached to the segment-lever or column-actuator 40, by which the corresponding numeral-wheel 41 is actuated and by which the corresponding type-segment 42 is positioned preparatory to printing the amount added. The attachment is preferably a pivotal one at $39^a$, so that the link will be free to move in obedience to the wing 38. A spring 68 acts on the link and returns it to normal position after each operation. The movement received by the link from the bar positions the lower end of the link varyingly in accordance with the power of the key by which the bar is actuated and brings the laterally-projecting pin 43 on the link under or in proximity to that one of the notches 44 in the arm 45 corresponding to said key. This arm, which is best shown at Fig. 16 and which I call the "numeral" or "graduated" arm, is arranged in the denominational line and provided with a series of nine notches 44, corresponding to the keys of the denomination and forming a sort of rack and with one notch 46 deeper than the others and a guard 47 back of notch 46. There is one such arm for each denomination, and the series of them is supported on the rock-shaft 48, Figs. 8, 9, 10, 12, and 17, which I call the "main actuator," because through it all the column-actuators are operated. The numeral-arms are positioned on the main actuator by the slotted cross-bars 51 and 52, carried on arms 50 50, secured to the actuator, and with the notched portion of the arms 45 projecting forwardly of the main actuator and their rear ends, which are forked, straddling the cross-rod 49, secured in the ends of arms 50. A spring 97 extends from each numeral-arm forwardly and downwardly to the cross-rod $97^a$, also inserted in the arms 50, and such spring coacts with the spring 53 on the answer-arm 96, as hereinafter described, in holding the numeral-arm down in normal position, so that such arms are not positively held, but are elastic and may yield, as herein-after more fully explained.

The main actuator is rocked by power from the main printing-lever 55 or other power device by which the machine is operated. Said power device actuates a cam 56, Figs. 2 and 3, having a slot 57, in which works the pin or roll 58 on the crank 59, mounted on cross-shaft 60. The latter at its farther end carries a crank 61, which is connected by a rod 62 to a crank 63 on the farther end of the main actuator. A spring 64 is attached to crank 63 and serves to return the main actuator and the other parts described after each operation. It will be seen from this description that the rocking motion of the main actuator received at each stroke or operation of the power device of the machine will impart a vibratory motion through an arc to the notched ends of the numeral-arms which is uniform in extent except as it may be varied by the yielding of springs 53 and 97. In this vibratory movement the notched or graduated portion of the numeral-arms soon encounters the pins 43 on such of the links 39 as have been positioned by the striking of the keys, as herein described, and such pins enter the notches 44, which correspond to the keys struck. By this engagement the pins automatically center themselves in the notches and will do so even if at the time the parts come together they are not accurately in register. With the pins thus centered in the notches the main actuator completes the movement imparted to it by the main lever 55, and in so doing it carries down the arms 45, and the latter carry with them the variable links, whose pins are centered in the notches 44. The variable links give motion in turn to the column-actuators, the extent of which is dependent upon the position of the notches in which the pins 43 are entered. Thus if a pin is in the notch 44 nearest the main actuator the movement imparted to the column-actuator will be slight, but if the pin is in the second notch from the main actuator the movement will be correspondingly greater, and so on, gradually increasing with each succeeding notch. It is because of these variable movements of the links 39 that the column-actuators are actuated in accordance with the power of the keys, and are thus adapted both to add the amount represented by the depressed keys upon the register-wheels and also to position the corresponding type ready for printing the same amount. In their normal position the variable links stand as at Fig. 8 and in their acting position at Fig. 9. In the former the pins are under the deep notches, and in this position the vibration of the arms 45 is idle so far as the links are concerned, the deep notches permitting full strokes without engaging the pins 43. The guards 47 prevent any tendency by the links to swing too far back.

65 represents one of the links connecting the column-actuator with the type-segment, and 66 is the toothed segment on the end of one of the column-actuators and meshing with the pinion 67, through which the corresponding numeral-wheel is actuated. The column-actuators are pivoted on the rod 190, so that their forward ends in the movements described travel through an arc, and they are provided each with a lifting-spring 191.

Figure 1:
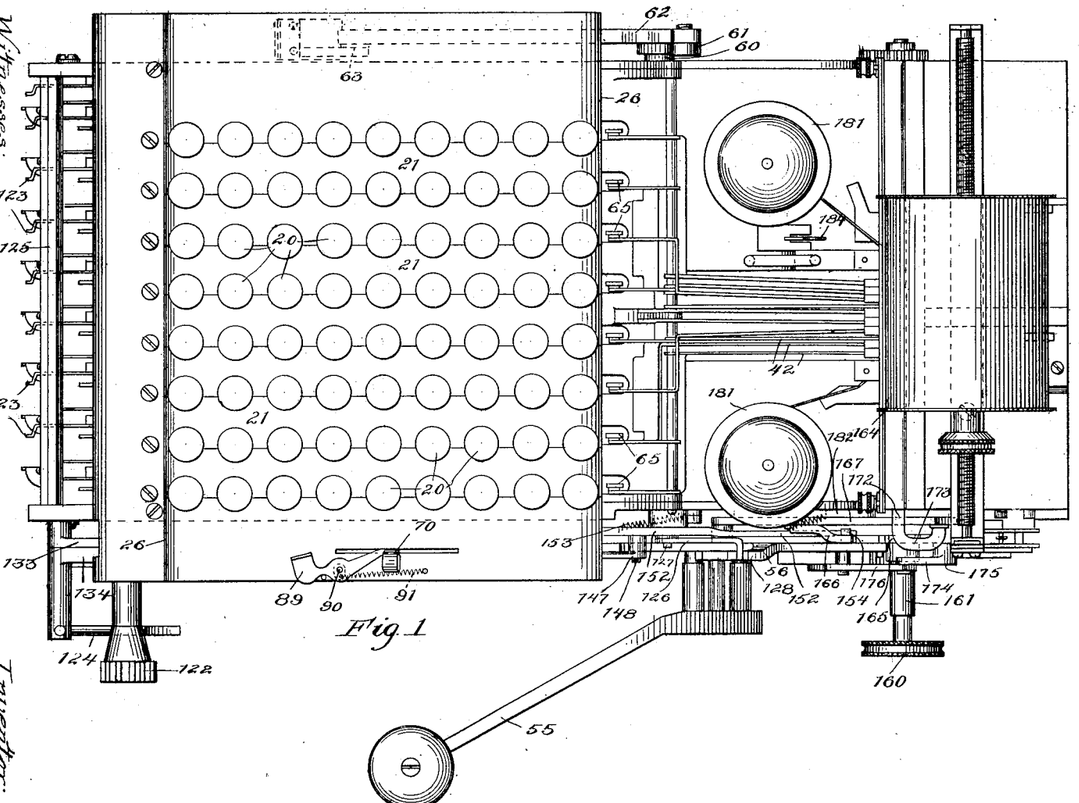
Figure 1 is a plan view of my improved machine.
Figure 2:
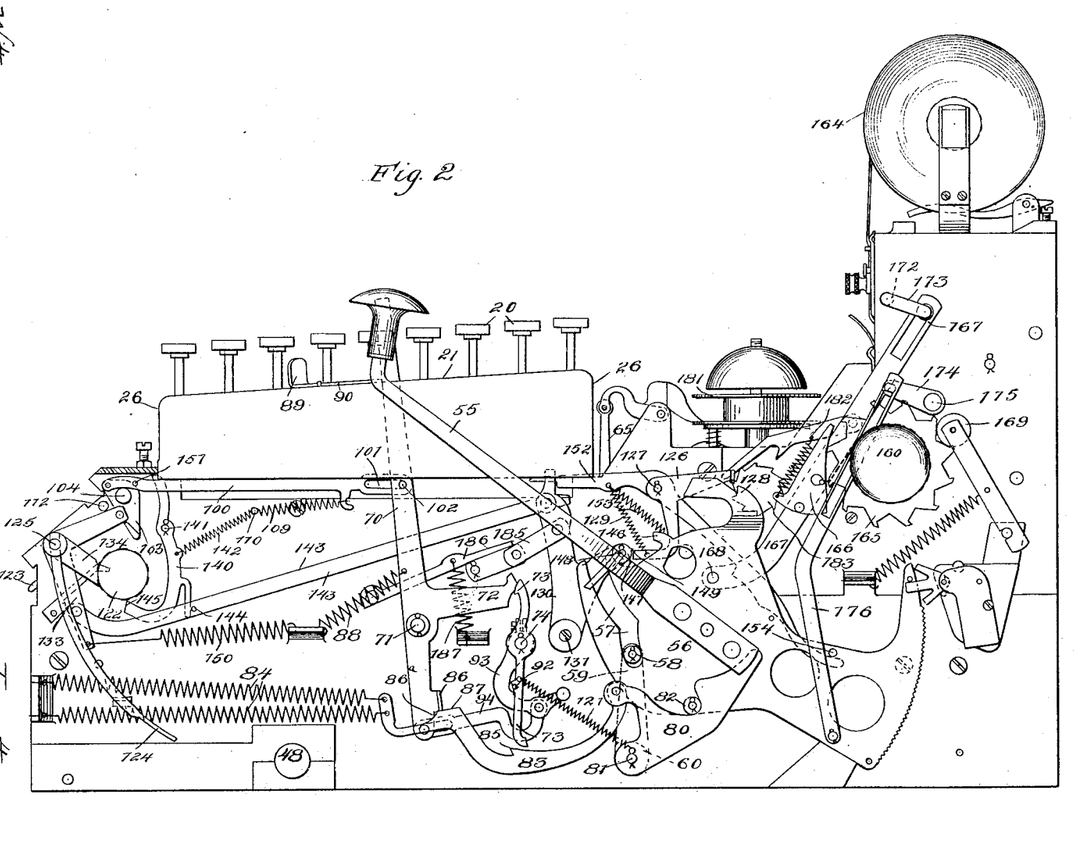
Figs. 2 and 3 are side elevations showing some of the parts in different positions.
Figures 3, 4:
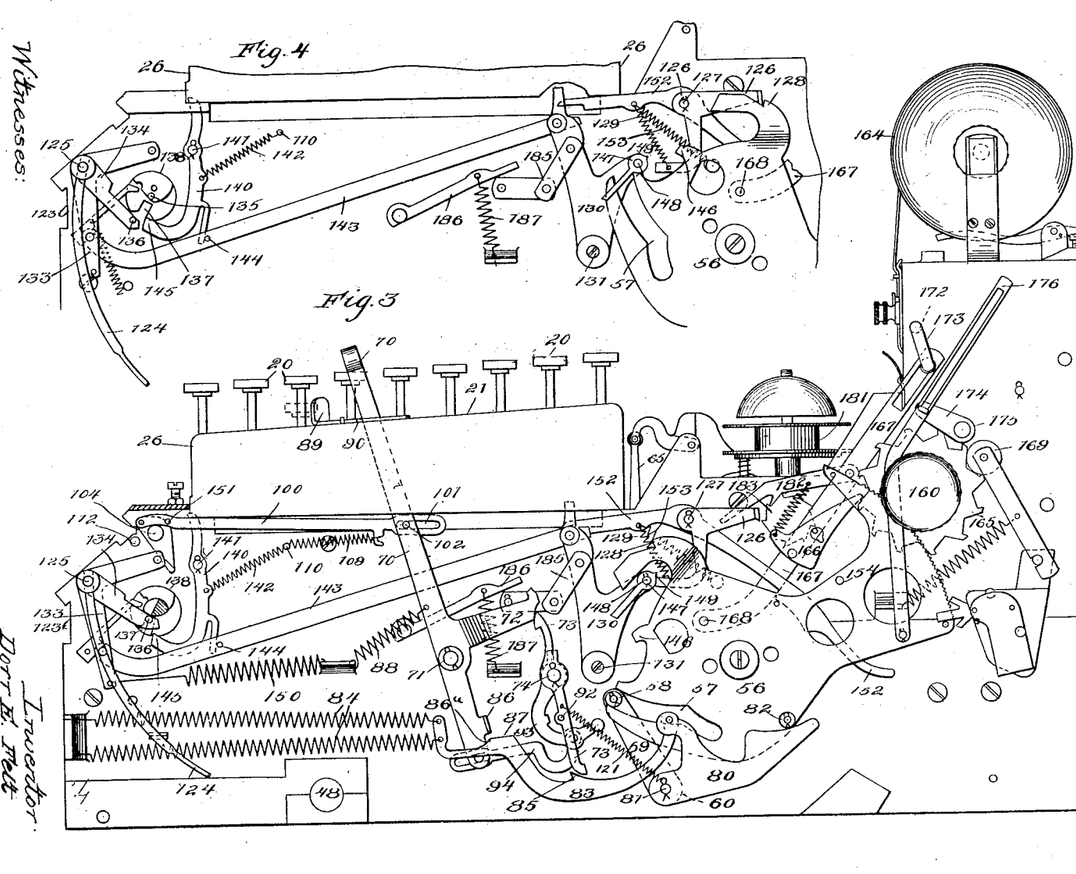
Figs. 4 and 5 are partial side elevations showing the parts in still other positions.
Figure 5:
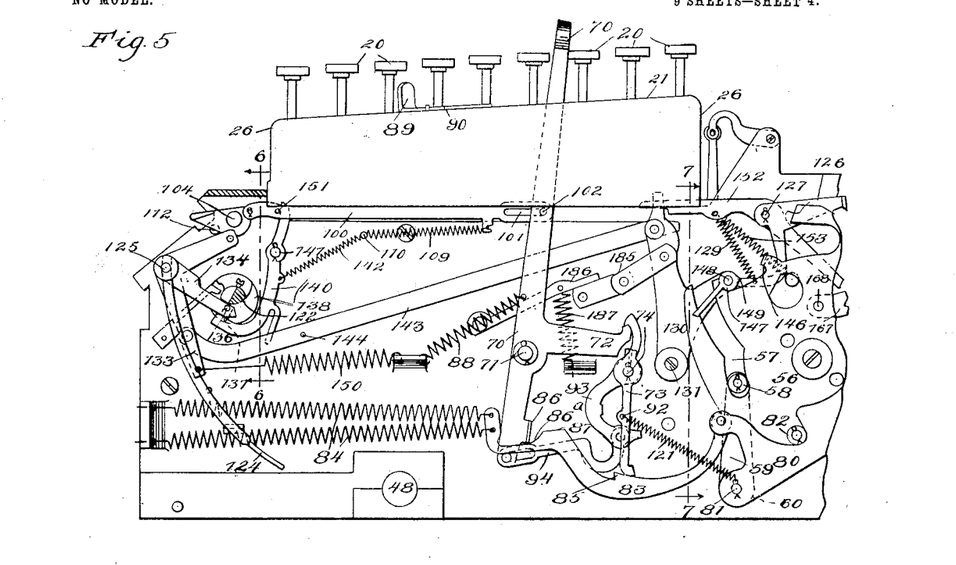
Figure 6:
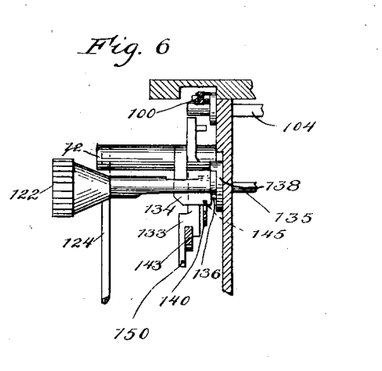
Figs. 6 and 7 are sections on the lines 6 6 and 7 7, respectively, of Fig. 5.
Figure 7:
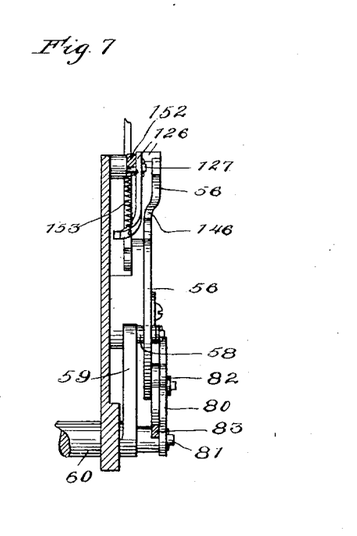

The releasing of all the depressed keys may be caused at any time by the lever 70, which is shown at Figs. 1, 2, 3, 5, and 11 in its various positions and which is pivoted at 71 and has an arm 72, bearing against the upper end of a swinging lever 73, loose on rock-shaft 74, but operating said shaft in one direction by means of a laterally-projecting pin 92 engaging the crank 93, fast on the shaft. This lever has a retracting-spring 121, and the shaft extends across the machine and is provided with a number of arms 75, on the ends of which is secured a cross bar or plate 76, having teeth 77 projecting upwardly from it. There is one tooth 77 for each denomination, and each tooth is arranged to bear against a curved portion 78 of the corresponding locking-plate 28 in such manner that when the shaft is rocked the tooth will be forced against the curved portion 78 and swing the plate 28 away from its acting position, and thereby cause the release of any key which may be locked by it at the time. To effect this result, which is common to all the plates, the lever 70 is simply swung toward the rear from its intermediate position, which is that illustrated at Figs. 1 and 2, though not to the extent shown at Fig. 5, which is the answer-printing position and in which the lever 70 is locked by lever 73, as explained later on. The spring 79, attached to a depending leg of rock-shaft 74, insures an immediate return of the rock-shaft and parts carried by it to normal position. Portions of this same mechanism are utilized in effecting the release of the keys at the conclusion of each printing operation by the following means: Pivoted at 81 is an irregular-shaped plate 80, controlled by the roller 82 on cam 56 and best shown at Figs. 2 and 3. A link 83 is attached to this plate, and springs 84 draw the link toward the front of the machine. Upon the upper edge of link 83 is a shoulder 85, which when the link is drawn rearwardly by the motion received from the main cam is engaged by the lower end of lever 73. When the main cam returns to normal position, it allows the link to return forwardly in obedience to the springs 84, and in so doing the link carries the lever with it for a short distance and until it slips out of engagement by reason of the depressing of link 83 by the projecting lip 86 on the lever, the lip being in contact with the incline 86ª on the link. This movement of the lever rocks shaft 74 sufficiently to release the keys, as will be understood from the description already given of the teeth 77, acting on the curved parts 78 of the locking-plates, and the other mechanism operating the teeth. This same lever 70 is also employed to throw the releasing mechanism out of service when it is desired to repeat numbers. To this end it is swung toward the front of the machine, as shown at Fig. 3. In assuming this position the arm 72 is so far withdrawn from lever 73 as to allow the latter to rock on its pivot under the power of spring 121 from the position of Fig. 2 to that of Fig. 3, and this movement carries the lower end of the lever 73 so far toward the rear of the machine that engagement between it and shoulder 85 upon link 83 cannot take place, and consequently shaft 74 remains idle and none of the operations above described and usually performed by it take place. The lever 70 is provided with a spring 88, which draws it toward the front of the machine, and it is normally prevented from assuming the last mentioned or repeating position by a catch 89, pivoted at 90, and with a spring 91, whereby the catch is held in acting position. This catch is readily turned, so as to release the lever whenever any repeating of numbers is desired, and when so turned out of the way the spring 88 quickly swings the lever to the repeating position. The lever 70 is also capable of being moved to a third position, and it is so moved when the answer or total is to be printed. This position is shown at Fig. 5, and in assuming it the projection 72 pushes lever 73 so far that the hook of the latter sets over the projection, as seen at Fig. 5, and thereby locks lever 70 in its new position. This lock remains in force until released by the link 83 upon the conclusion of the answer-printing operation, and which release is similar to the action of said link at the conclusion of the normal printing operations and has already been described. In setting the lever 70 for answer-printing several other results are also caused. Thus the link 94, which connects the free end of crank 93 on shaft 74 with the lower end of the lever 70, imparts a greater rocking motion to shaft 74 than it receives in any of the ways previously described, and in this rocking movement the plate 76 engages the proximate edges of the depending portions 95 of the cam-bars 31 and carries all said bars toward the rear of the machine sufficiently to bring the spaces between the inclines 34 of the bars under the keys, so that if any attempt is made to operate the keys while the machine is thus set for printing the answer no result will be produced beyond an idle descent of the key. In this same movement of the plate 76 all the teeth 77 act on the locking-plates 28 and swing them away from the keys, so that they cannot act on the latter and so that any keys which may be down at the time will be released. Both the keys and the locking-plates are thus thrown temporarily out of service. The link 94 is slotted where it is joined to the lever 70, so that the link need not change position when the lever is set for repeating numbers. These features will be understood from Figs. 5, 9, 11, and 17. The increased movement given the bars 31, just described, also causes an increased swinging movement by the variable links 39, which carries their pins 43 beyond the notched arms 45. As the pins project on both sides of the variable links, they are adapted when thus positioned to engage the spring-depressed arms 96, Fig. 17, which in some respects are similar in size and shape to the arms 45 and are arranged each parallel to one of the latter and upon the farther side of the variable links from the arms 45, as seen at Fig. 10, and they are supported on the main actuator 48 and are secured in the plates 51 and 52 in much the same way as the arms 45, each being also provided with a spring 53, attached to cross-rod 54 to hold it to the actuator. The arms 96 have no notches, but are provided with guards 98 at their extreme ends, which act as stops to the pins 43 and prevent the links 39 from moving too far when positioned by the cam-bars 31. Although the arms 96 are provided with lateral projections 99, extending over the companion arm 45, so that the latter compels the arm 96 to move with it, and thus adds the power of the spring 53 to that of its own spring, yet this does not interfere with the independent movements of the arm 96 described in the next paragraph.

With this construction and with the lever 70 set as described, so that the pins 43 of all the variable links are in position to be engaged by the arms 96, I print the totals or answers by operating the main lever or power device 55. This causes a rocking of the main actuator 48, as already described, and in such stroke the arms are carried down for variable distances, the springs 53 yielding, so that partial strokes are permitted to the arms. The length of the variable strokes depends on the position of the numeral-wheels at the time, and the column-actuators are arrested when they have moved far enough to position the types which correspond to the numbers exposed on the numeral-wheels in printing position. All this is fully explained below.

When the lever 70 is set for the printing of totals, it carries the connecting-rod 100 with it. (Shown at Fig. 5.) This rod has a slot 101, in which a pin 102, borne by the lever, works and which is adapted to permit the changes in position of the lever when it is shifted to secure repetitions and to cause the release of the depressed keys to take place without affecting the rod 100. The rod is attached at its farther end to a crank 103 on the rock-shaft 104, extending across the machine and located over the series of numeral-wheels, and the shaft is angular, so that when rocked it is adapted to depress the series of locking stop-levers 105 and force them to engage the numeral-wheels, as described in my Letters Patent No. 661,121. In this manner the numeral-wheels are absolutely locked by the setting of lever 70 for answer-printing and remain so until the conclusion of the operation, when they are released. The stop-levers engage the pins 107, connecting the numeral-wheels with their companion ratchets, and they are pivoted on a cross-shaft 106, and each has a lifting-spring 108 for normally holding it out of action. The shaft 104 and the rod 100 are returned to normal positions by the spring 109, attached to the rod at one end and to a stationary pin 110 at the other, the setting of lever 70 for answer-printing distending the spring.

Figure 9:
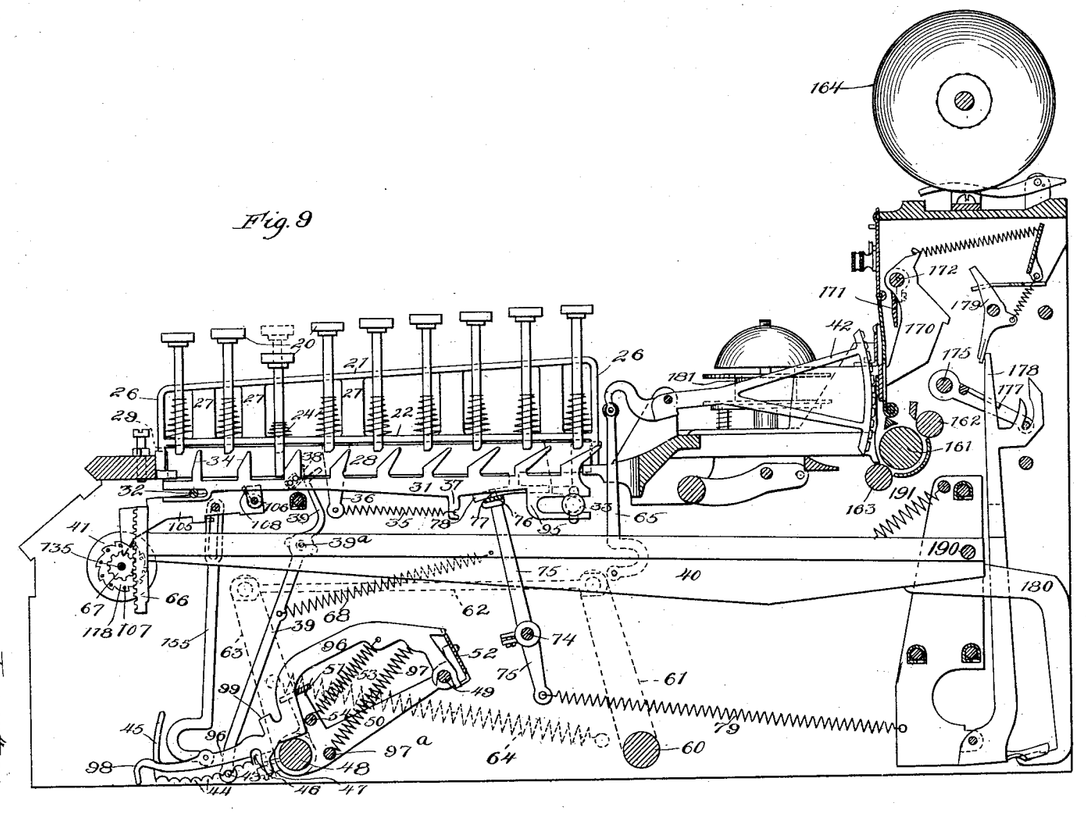
Figure 10:
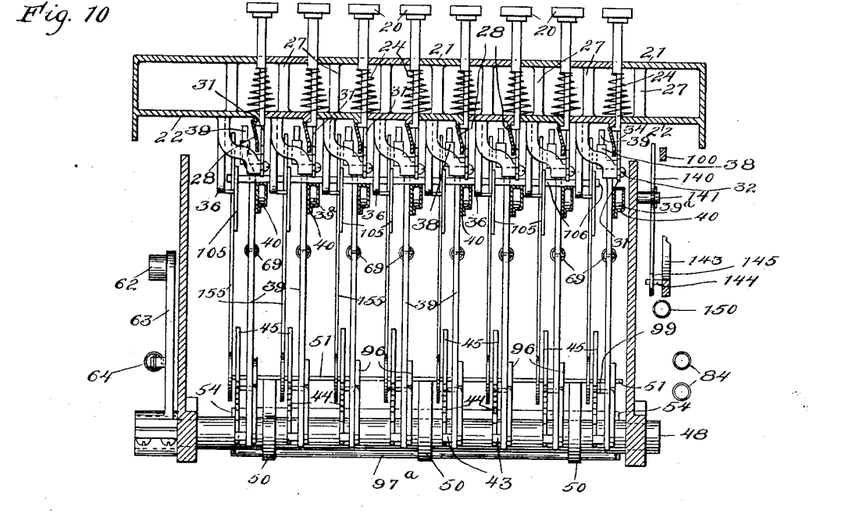
Figs. 10 and 11 are cross vertical sections on the lines 10 10 and 11 11 of Fig. 8.
Figure 11:
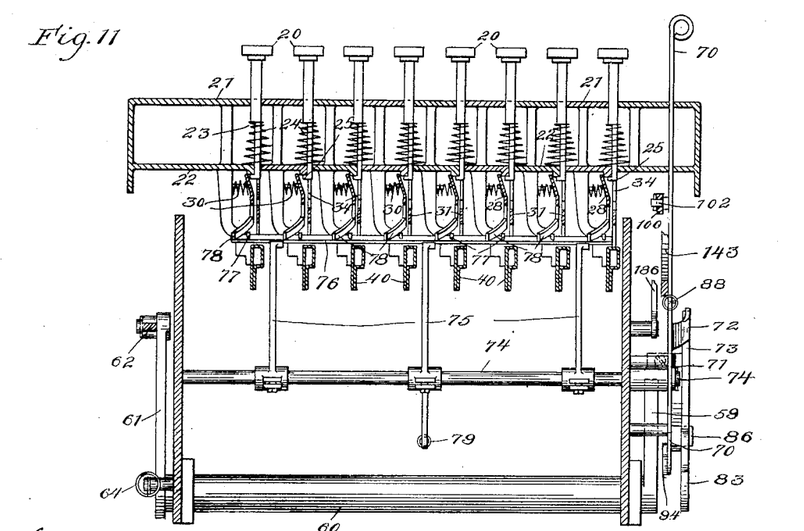
Figure 12:
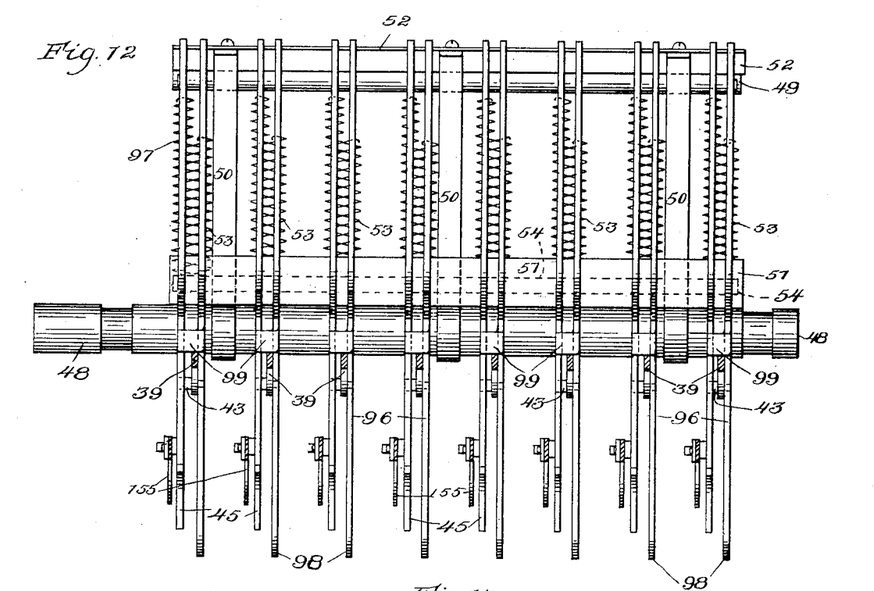
Fig. 12 is a section on the line 12 12 of Fig. 8.
Figure 19:
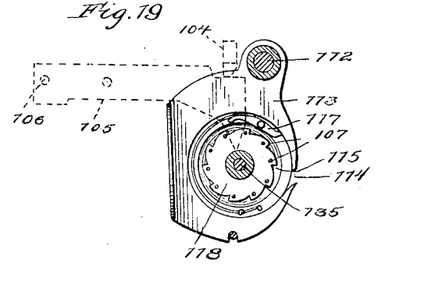
Fig. 19 is a partial vertical section showing the answer-ring.
Figures 20, 21, 22:
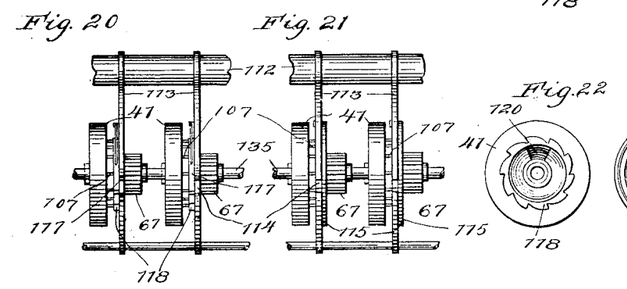
Figs. 20 and 21 are front elevations of the numeral-wheels and answer-rings, showing the latter in different positions.
Fig. 22 is a side view of the numeral-wheel ratchet.
Figure 23:
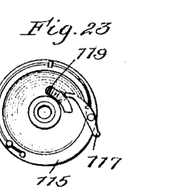
Fig. 23 is a similar view of the disk carrying the pawl actuating said ratchet.

The series of locking-levers 105 (shown at Fig. 19) is also connected to the numeral-arms 45 of corresponding denominations by vertical links 155, as seen at Fig. 9. The links are slotted at their upper ends, and pins on the levers 105 enter the slots. By this construction the levers 105 are forced to lock the numeral-wheels at each stroke of the main power device both in printing and adding, and in printing the totals, and by reason of the slot the locking takes place at the conclusion of the downstroke of the power device and after the wheels have been actuated and the carrying has been done.

Figure 18:
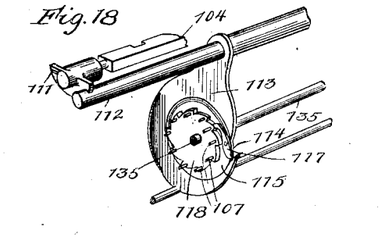
Fig. 18 is a perspective of the answer-ring and its actuating mechanism.

The shaft 104 carries at its farther end a cam 111, (shown at Fig. 18,) which works in a slot formed in a sliding bar 112, extending across the series of numeral-wheels and carrying a series of what I call "answer-rings" 113. There is one of these rings for each denomination, and they are cut out of thin flat metal and each so as to form an interior circle, which, however, is broken at 114. (See Figs. 18 and 19.) The ring-opening is slightly larger than the disks 115, of which one is attached to each of the series of pinions 67, meshing with the column-actuators 40 and driving the numeral-wheels through the engagement of the spring-pawls 117 on disks 115 with the ratchets 118, connected to the numeral-wheels by pins 107. The shifting of bar 112 by the cam occurs whenever shaft 104 is rocked and carries the rings into position over and surrounding the disks. Such movements occur always when the disks are in their normal positions with the pawls 117 opposite the breaks 114 in the rings, and consequently the pawls do not interfere with the shifting of the rings. The rings are adapted to throw the pawls out of service as soon as the disks begin to turn, the heels of the pawls being depressed by their contact with the interior surface of the ring sufficiently to lift the acting ends away from the ratchet, and the pawls remain out of service during the time they are thus under the control of the rings. During this time the pinions 67 and the disks are free to be rotated by the column-actuators 40 independently of the numeral-wheels and ratchets, which are locked, as already described, by the stop-levers 105. Such rotation of the pinions and disks continues until the laterally-projecting spring-stops 119 on the side of the disks encounter and enter the recesses 120 on the proximate side of the corresponding ratchets. The recesses 120 are abrupt at one side, so that the points of the stops engage with them and serve thereby, the ratchets being locked, to arrest the motion of the disks, pinions, and column-actuators, and this arrest takes place sooner or later, according to the position occupied by the numeral-wheels at the time. Thus if a wheel stands at "1" the arrest will take place early in the rotation of the disk. If it stands at "2," the disk will be permitted a further rotation, and at "3," still more, and so on. At the time the arrest occurs the type-segments will have been positioned with the proper type on each corresponding to the numbers shown at the sight-opening on the numeral-wheels in position to print. The springs 53 accommodate any further movement or stroke of the main actuator occurring after the column-actuator and pinion have been arrested, as just described. Upon the completion of the stroke of the main lever the locking engagement between the lever 73 and the arm 72 on the lever 70 is broken, so that lever 70 returns to its normal position under the power of spring 88 and leaves all the other parts of the mechanism free to resume their normal positions in readiness for the next operation.

In former machines difficulty has arisen from the fact that the operator sometimes turns the canceling-knob 122 part way around and then instead of completing that operation proceeds to operate the keys and the main lever or power device, thereby adding numbers to the amount already registered on the wheels and printing the same numbers. Incorrect results are produced in this way, because the carrying-levers 123 are all thrown out of service by the rocking of shaft 125 by hand-lever 124, preparatory to canceling, and remain out of service until the canceling is concluded, and consequently while the wheels may be actuated with the canceling only partially done no carrying can occur during that time. To prevent any such difficulty, I now provide means whereby the main lever will be automatically locked during all canceling operations, so that no adding or printing can be done during the intervals occurring between the start and the finish of the canceling. These means are best shown at Fig. 4, and consist of the rocking elbow-shaped stop-lever 126, pivoted at 127 and having an arm to engage the shoulder 128 on the main cam 56, the spring 129 tending to force the lever into engagement with the cam and a device for normally preventing such engagement. This device is the V-shaped piece 130, pivoted at 131 and connected by the link or bar 143 to arm 133 on the shaft 125, rocked by the lever 124. The V-shaped piece 130 is oscillated whenever the canceling-lever 124 is operated, and in such movement it allows the elbow-lever 126, whose lower arm rests against the edge of the V-shaped piece, to rock far enough on its pivot to permit its other arm to engage the cam. The cam will now be locked, so that the main lever cannot be operated, and will remain locked until the operator completes the canceling, when the lever 124 and shaft 125 are allowed to rock back to normal position, as explained below. The lever 124 is mounted loosely on the end of shaft 125, but an arm 134 extends from the hub of the lever and in front of arm 133, so that when the lever 124 is operated the arm 134 compels arm 133 to move with it, but when the power is applied to arm 133 by link 143 the arm 134 remains stationary, as the movement of arm 133 is then away from arm 134.

The canceling-knob 122 is attached to the end of the numeral-wheel shaft 135, and the latter is normally locked by the pin 136 on the arm 134 entering the slot 137 in the disk 138 on the end of the shaft, as will be understood from Fig. 4. This lock is at once released when the operator moves lever 124 preparatory to canceling, as that movement carries the pin out of the slot.

To prevent any attempt at canceling pending an incomplete stroke of the main lever, I provide means for locking the hand-lever 124 at the inception of the stroke of the main lever, such locking means being shown at Figs. 2, 3, and 4 and embodying a swinging lever 140, pivoted at 141, provided with a spring 142, attached to it below the pivot and swinging it in one direction, and the link or bar 143, which has a laterally-projecting pin 144 acting on the lower end of lever 140 and forcing it in the other direction and toward the front of the machine. In this manner the point 145 of lever 140 is carried under the arm 134 of the canceling-lever and prevents any actuation of the latter so long as bar 143 remains in the position it assumes in thus actuating lever 140. The bar 143 is pivotally joined to arm 133 and is itself actuated by the V-shaped piece 130 early in the movement of the main cam 56 and lever 55 through the contact of the projection 146 on the cam with the sleeve 147 on the pin 148, secured in the V-shaped piece, the sleeve having a shoulder 149 on one side, which is engaged by said projection and causes a partial turning of the sleeve on the pin. The shoulder, however, is out of the way of the projection during the return of the main cam and its lever, and consequently no actuation of the V-shaped piece occurs except at the beginning of the downstroke of the main lever. The bar 143 retains control of the canceling-lever until near the end of the upstroke of lever 55, when it is returned by spring 150, attached to arm 133. It is locked in its acting or forward position during the strokes of the main lever by a latch 152, pivoted on pivot 127 and thrown into engagement by spring 153 and released by the pin 154 on the main cam striking the upper edge of the heel of the latch when the cam returns to normal position. The latch is offset at its acting end, and thus adapted to engage the bar with certainty.

The positioning of the lever 70 for answer-printing likewise locks the canceling-lever, so that no cancellation can take place pending the answer-printing operation. In thus positioning lever 70 the rod 100 is shifted from the position of Fig. 2 to that of Fig. 5, and through the medium of a laterally-projecting pin 151 it rocks lever 140 and forces the point 145 of that lever under the arm 134 of the canceling-lever, and thus locks the latter in the same manner as when lever 140 is actuated by bar 143. The return of lever 70 at the end of the answer-printing operation allows rod 100 to return, so that lever 140 is also permitted to move back to the position of Fig. 2.

In the mechanism above described it will be noticed that all the movements of the column-actuators are due to the variably-acting links and that as these are pivoted to the actuators the power is always applied at the same point thereon whether the actuation is for the addition of a "1" or a "9," although the stroke imparted in one case is short and in the other long. With the power thus applied at the same point to the column-actuators and with accurately-formed pinions 67 I have no trouble in printing all the figures in a number in perfect alinement and am able to guard against the imperfect alinement due to the unequal springing of the segment-levers when the power is applied to them at different points, as in the previous machines.

I have shown in the drawings a number of other features in addition to those above set forth; but they are not new at the present time, and I therefore merely mention them briefly without extended description.

Figure 8:
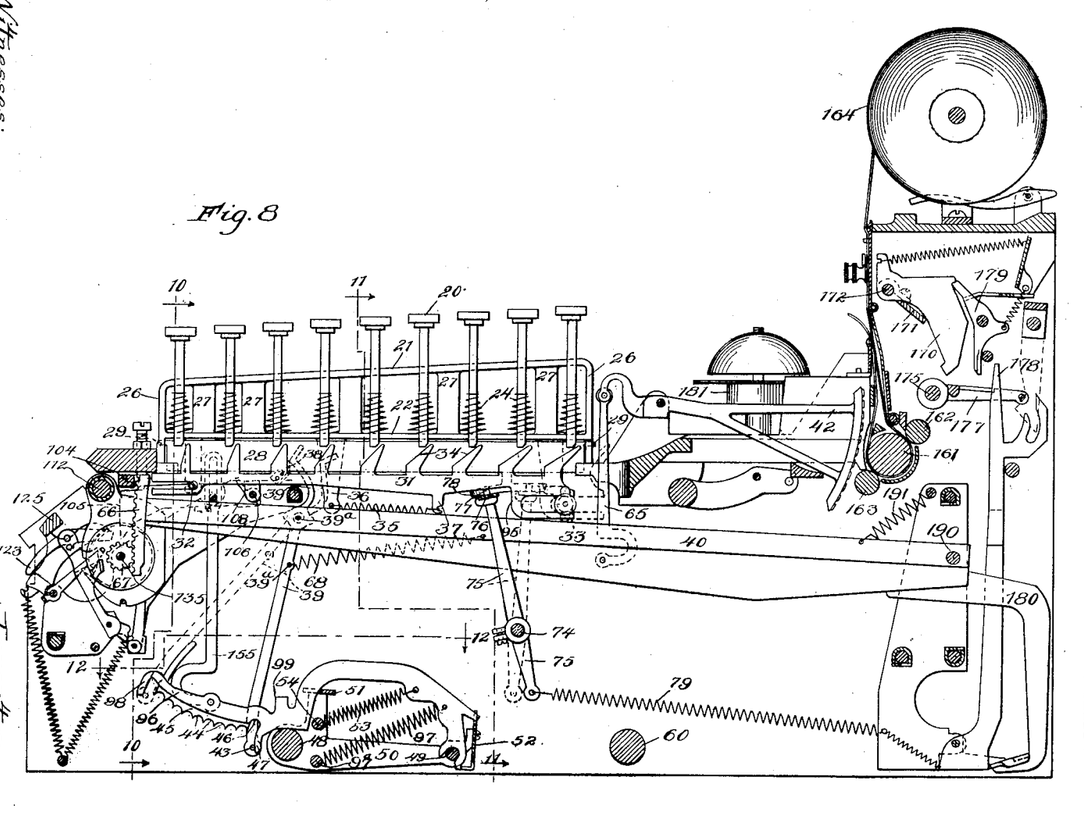
Figs. 8 and 9 are longitudinal vertical positions, showing the parts in different positions.

160 is the paper-feed-roll knob, secured on the roll 161. Guide-rolls 162 and 163 are placed at opposite sides of the roll 161, and the paper is fed to the feed-rolls from the supply-roll 164. The feed-roll carries a ratchet 165, which is actuated by the pawl 166, mounted on the lever 167, attached to the main cam at 168. A spring-pressed dolly-roll 169 rests on the ratchet 165. These features are shown at Figs. 3 and 8.

170 represents the printing-hammers, and 171 the swinging frame or plate by which they are returned to normal position after printing, such frame being attached to the shaft 172, on which the hammers are mounted, and shaft 172 receiving its rocking motion from crank 173, the end of which is engaged by the slot in the upper end of lever 167. A crank 174 on the shaft 175 and operated by the slotted lever 176, also attached to the main cam, actuates the rocking frame 177, whereby the oscillating tailpieces 178, which touch off the triggers 179 of the printing-hammers, are regulated. The extensions 180 of the segment-levers determine when the tailpieces shall operate. (See Figs. 3 and 8.)

The ink-ribbon spools are shown at 181, and 182 is the pawl and 183 the ratchet for actuating the spools through connections. (Not illustrated.) A portion of the spool-reversing mechanism is shown at 184. The V-shaped piece is attached at one side to a toggle 185, which serves to limit its motion in one direction, and the lever 186 and spring 187 tend to hold the toggle normally bent by their pressure on the top of that one of its members which is stationarily pivoted.

It will be seen that between the final actuating-shaft 48 and the numeral-wheels, on the one hand, or the type-segments, on the other, and also the numeral-wheel stop, all of which parts have to be moved through a given predetermined distance by power derived from said actuating-shaft, there are two joints in each denomination extremely liable to wear. They are located between the shaft and the column-actuatators. The motion of the type-segment especially must be absolutely accurate—that is to say, the type-segment must present its various characters exactly on the line—since even a variation so small as the one-hundredth of an inch in the printed characters is offensively apparent in the alinement thereof. Now as there are a number of such type-segments, one for each denomination, and as the denominations are unequally used the printed alinement of the characters would be quickly destroyed by this unequal wear except for the interposition of the yielding spring-power between the actuating-shaft and the jointed connections above referred to. By means of this yielding connection it is possible to give the actuating-shaft at the outset a little more movement or throw than is required to operate the jointed parts, such slight excess being consumed in stretching the spring. As the parts wear, and lost motion is thereby introduced, the spring-power will be less and less called upon and more and more of the shaft's motion imparted to the jointed parts and the wear thus compensated for in each particular group of parts, so that the alinement of the characters will be maintained and the extent of movement of any particular segment-lever and its group of parts will be absolutely and accurately limited by the equispaced pins in the numeral-wheel in their contact with the stop 105.

Of course it will be understood that I do not wish to be limited to the precise construction shown, except where such limitation is rendered necessary by the prior art.

I claim—

1. The combination with a main actuator and a series of column-actuators, of separate variable connections one for each column communicating more or less movement from the main actuator to the column-actuators.

2. The combination of a series of column-actuators, a main actuator, and a separate pivoted link between each column-actuator and the main actuator, such links being adapted to be shifted to give more or less movement to their respective column-actuators.

3. The combination of a series of column-actuators, a main actuator and a link for each column pivoted to one and movable upon the other of the actuators, and serving to give more or less movement to the respective column-actuators.

4. The combination of a column-actuator and a main actuator each pivoted to move in an arc, and a variable connecting device between the two, connected to one at a fixed distance from its pivot, and adjustably connected to the other at varying distances from its pivot, substantially as specified.

5. The combination with a main actuator and a column-actuator, of a variable elastic connection between the two whereby more or less of the movement of the main actuator may be communicated to the column-actuator, substantially as specified.

6. The combination of a column-actuator, a main actuator and a pivoted link between the two and elastically connected to one of them and adapted to be shifted to give more or less movement to the column-actuator, substantially as specified.

7. The combination of a column-actuator, a main actuator and a link pivoted to one and movable upon the other and serving to give more or less movement to the column-actuator, the link being elastically connected to one of said parts, substantially as specified.

8. The combination of a column-actuator and a main actuator, each pivoted to move in an arc, with variable elastic means connecting the two, such means being joined to one at a fixed distance from its pivot, and adjustably connected to the other at varying distances from its pivot, substantially as specified.

9. The combination of a numeral-wheel, provided with equispaced stopping-points, a pawl or stop engaging said points, a column-actuator for rotating said numeral-wheel, and a main actuator elastically connected to the column-actuator, substantially as specified.

10. The combination of a series of numeral-wheels each provided with equispaced stopping-points, a pawl or stop for each wheel engaging said points, a column-actuator for each column, a main actuator common to all the columns and elastic connections between the column-actuators and said main actuator, substantially as specified.

11. The combination with the actuating-shaft and the column-actuators, of a spring-held yielding means communicating the motion of the actuating-shaft to the column-actuator, substantially as specified.

12. In an adding and printing machine the combination of the column-actuator, the numeral-wheel provided with equispaced stopping-points and rotated by the said actuator, a stopping pawl or lever, a link or connection from said stopping-lever to an arm on the main actuator, said main actuator, said arm thereon, and a spring connection between the main actuator and the arm, and a variable-link connection from the said arm to the column-actuator, substantially as specified.

13. The combination with the adding and printing mechanisms and the power mechanism whereby the same are actuated, of the keys and a variably-acting link positioned by the keys and connecting the printing and adding mechanisms with the power mechanism and determining the action of the latter, substantially as specified.

14. The combination with the adding and printing mechanisms and the power mechanism whereby the same are actuated, of the keys, a variably-acting link positioned by the keys, and an arm upon the actuating mechanism adapted to engage the link in any position of the latter, substantially as specified.

15. The combination with the adding and printing mechanisms and the power mechanism whereby the same are actuated, of the keys, a variably-acting link positioned by the keys, and a notched arm upon the actuating mechanism adapted to engage the link in different positions of the latter, substantially as specified.

16. The combination with the adding and printing mechanism and the power mechanism whereby the same are actuated, of the keys, and a link variably positioned by the keys and adapted to be connected in various positions to the power mechanism, the position of the link determining the extent of actuation given the adding and printing mechanism, substantially as specified.

17. The combination with the adding and printing mechanisms and the power mechanism whereby the same are actuated, of several denominational series of keys, a variably-acting link for each denomination controlled by the keys of the corresponding denomination, and a yielding arm upon the power mechanism adapted to engage the link in any position of the latter.

18. The combination with the printing and adding mechanisms of the keys and means whereby the latter control said mechanisms consisting of a movable bar having digital inclines, a link variably positioned by said bar, and a swinging notched arm engaging the link, substantially as specified.

19. The combination with the printing and adding mechanisms of the keys, and means whereby the latter control said mechanisms, consisting of a link variably positioned by the act of depressing the keys and joined to said mechanisms, a power mechanism whereby said mechanisms are actuated, and means for coupling said link in its various positions to the latter, substantially as specified.

20. The combination with the adding and printing mechanisms, and the power mechanism whereby the same are actuated, of several denominational series of keys, a variable-acting link for each denomination controlled by the keys of the corresponding denomination, a main actuator forming part of the power mechanism, and a separate arm for each link mounted on said actuator and adapted to engage its corresponding link in any position of the latter.

21. The combination with the adding and printing mechanisms and the power mechanism whereby the same are actuated, of the keys, a variably-acting link controlled by the keys, a main actuator forming part of the power mechanism, and an arm mounted on the actuator and held thereon by spring-power, and adapted to engage the link in any position of the latter, substantially as specified.

22. The combination with the column-actuator, of the power mechanism, the keys, a link controlled by the keys as to position and to which it is moved by them and pivoted to the actuator, and means for coupling the link in any of its positions to the power mechanism, whereby the latter operates the actuator in accordance with the position given the link by the keys, substantially as specified.

23. The combination with the denominational column-actuators, the denominational series of keys, and the power mechanism for operating said actuators, of a series of links or devices each pivoted to one of the actuators and communicating motion to it from the power mechanism according to the position of the link, substantially as specified.

24. The combination with the denominational column-actuators, the denominational series of keys, and the power mechanism for operating said actuators and having a uniform stroke, of a series of links or devices for connecting the column-actuators to the power mechanism, such links being variably positioned by the keys and their position determining the extent of motion communicated by them, substantially as specified.

25. The combination with the keys of a denomination, a column-actuator for the same denomination, and the main actuator, of a single power-transmitting device carrying power from the main actuator to the column-actuator, and adjustable so it may vary the extent of movement transmitted, said device being moved into operative position by the keys, substantially as specified.

26. The combination with a plurality of denominations of keys, of a column-actuator for each denomination, and a main actuator for all the denominations having a uniform stroke, of a single power-transmitting device in each denomination carrying power from the main actuator to the column-actuator of the same denomination, such devices being moved into operative position by the keys of the denomination to which they belong and acting to vary the power transmitted according to the value of the keys by which they are positioned, substantially as specified.

27. In a machine for adding and printing numbers, the combination of a column-actuator for presenting the various types to be printed, a link connecting said lever to the main actuating device, said main actuating device, means as a cogged segment carried on said column-actuator for rotating the numeral-wheels, a detent-lever for locking the wheels, a link extending from said detent-lever to a notched arm, said notched arm mounted on said main actuating device and held thereto by spring-power, a lever or link having its end adjustable to engage the notches in the notched arm, and communicating the motion of the notched arm to the column-actuator in variable amounts according to the notch engaged, whereby a self-adjusting mechanism is produced, substantially as specified.

28. The combination with the column-actuator for actuating the numeral-wheel and the type-segment, of the numeral-wheel-locking lever connected to a notched arm, a link connecting said column-actuator with said notched arm and capable of being positioned in the various notches thereof, said notched arm mounted on an actuating-shaft and held thereon yieldingly by spring-power, whereby if the actuating-shaft be moved too far the spring-power between it and the notched arm may yield to compensate for the over motion, and whereby special adjustment may be rendered unnecessary, substantially as specified.

29. The combination with the column-actuator and the main actuator, of the variable link pivoted to the column-actuator and having a projecting pin, an arm borne on said main actuator and having notches to engage said pin, means for positioning said link according to the power of the key struck, and a set of digital keys corresponding to the notches in the arm, substantially as specified.

30. The combination with the column-actuator and the main actuator, of the variable link pivoted to the column-actuator and having a projecting pin, an arm borne on said main actuator and having notches to engage said pin, a set of digital keys, and means whereby the keys may position the link and thus determine which of the notches shall engage the link, substantially as specified.

31. The combination with the column-actuator and the main actuator, of the variable link pivoted to the column-actuator and having a projecting pin, an arm borne on said main actuator and having notches to engage said pin, a set of digital keys corresponding to the notches in the arm, and a cam-bar acted upon by the keys and serving to position the link in accordance with the value of the key, substantially as specified.

32. The combination with the column-actuator and the main actuator, of the link 39, the cam-bar for adjusting the link, the notched arm 45 and means whereby the arm is supported upon and made to move with the main actuator, substantially as specified.

33. The combination with the denominational series of depressible keys, of a series of cams upon a bar under the keys adapted to be moved by the keys through varying distances according to the keys struck, a column-actuator, a main actuator, and a variably-acting link for connecting said actuators and positioned at different points relative to one of them by said cam-bar, and a graduated arm on the main actuator engaged by the link, substantially as specified.

34. The combination with the column-actuator and the main actuator of means for regulating the strokes imparted by the latter to the former, consisting of the keys, the cam-bar, the link pivoted to the column-actuator and positioned by the cam-bar, and the notched arm borne on the main actuator, substantially as specified.

35. The combination with the series of column-actuators and the main actuator, of the keys, means for locking the keys in the depressed position, the cam-bars actuated by the keys through varying distances in accordance with the power of the keys which are struck, the variable links positioned by the bars, and the notched arms mounted on the main actuator, substantially as specified.

36. The combination with the variably-positioned link and the means for positioning it, of the main actuator and the notched arm mounted thereon and engaging the link, the arm having nine operating-notches and a deep non-operating notch, substantially as specified.

37. The combination with the variably-positioned link and means for positioning it for printing totals, of the answer-arm mounted on the main actuator and held thereto by a spring, and said actuator, substantially as specified.

38. The combination with the variably-positioned link, and a hand-lever whereby it may be positioned for printing totals, of the main actuator and an answer-arm mounted on the actuator and held thereto by a spring, substantially as specified.

39. The combination with the column-actuator and the main actuator, of the variably-positioned link, means for positioning said link for printing totals, a spring-held answer-arm on the main actuator, and means for determining the amount of movement of the column-actuator, substantially as specified.

40. The combination with the column-actuator and the main actuator, of the variably-positioned link, means for positioning said link for printing totals, a spring-held answer-arm on the main actuator, the numeral-wheels, means for locking the wheels during the answer-printing, and means for determining the amount of movement of the column-actuator, substantially as specified.

41. The combination with the column-actuator and the main actuator, of the variably-positioned link, means for positioning said link for printing totals, a spring-held answer-arm on the main actuator, the numeral-wheels, means for locking the wheels during the answer-printing, means for determining the amount of movement of the column-actuator, and printing mechanism, substantially as specified.

42. The combination with the variably-positioned link for transmitting power from the main actuator to the column-actuator, and said actuators, of a graduated notched numeral-arm employed in printing the numerals, and an answer-arm employed in printing totals, said arms being both mounted on the main actuator and both being adapted to engage the link, substantially as specified.

43. The combination with the variably-positioned link for transmitting power from the main to the column actuator, and said actuators, of a graduated notched arm employed in printing the numerals, an answer-arm employed in printing totals, both said arms being mounted on the main actuator and held down thereon by springs, and both being adapted to engage the links, substantially as specified.

44. The combination with the variably-positioned link, of the notched numeral-arm at one side of the link and the answer-arm at the other side thereof, each adapted to engage the link in some of its positions, substantially as specified.

45. The combination with the column-actuator and main actuator, of a variably-positioned link connected to the former, spring-depressed arms on the main actuator adapted to engage said link, means for setting said link so it will engage one arm when printing the numerals, and means for setting the link so it will engage the other arm when printing the totals, substantially as specified.

46. The combination with the column-actuator and main actuator, of a variably-positioned link connected to the former, spring-depressed arms on the main actuator adapted to engage said link, means for setting said link so it will engage one arm when printing the numerals, means for setting the link so it will engage the other arm when printing totals, and printing mechanism, substantially as specified.

47. The combination with the spring-pressed arms 45 and 96 of the variably-positioned link engaged by one arm in each of nine different positions and the other arm in still another position, means for actuating said arms, and a column-actuator to which varying movements are transmitted by the link in accordance with the position of the latter, substantially as specified.

48. The combination with the series of key-locking plates 28 having curved portions 78, of the lever 70, the rock-shaft 74 operated by the lever, the cross-bars carried by the shaft and having teeth engaging the plates, substantially as specified.

49. The combination with the key-locking plates 28 having curved portions 78, of the rock-shaft 74, the toothed cross-bar mounted thereon, and means whereby said shaft will be rocked so as to release said plates at the end of each printing operation, substantially as specified.

50. The lever 70 in combination with key-releasing mechanism, repeating mechanism and answer-printing mechanism, all controlled by said lever, substantially as specified.

51. The combination with the series of bars 31 having a series of graduated cams, of the lever 70 and connections whereby said bars are moved longitudinally so as to carry the cams away from their operative positions when the lever is set for answer-printing, substantially as specified.

52. The combination with the lever 70 controlling the answer-printing, of the keys, the plates locking the keys and means whereby the plates will be swung laterally of the keys to release them on the setting of the lever 70 for answer-printing, substantially as specified.

53. The combination with the lever controlling the answer-printing, of variable links 39 one for each denomination positioned for answer-printing by the setting of the lever, substantially as specified.

54. The combination with the variable links and vibrating answer-arms 96, of the lever 70 controlling the answer-printing and setting said links to operate with said arms, substantially as specified.

55. The combination with the cam-bars and the variable links positioned thereby, of the lever 70, and connections whereby said lever may move said bars and position the links for answer-printing, substantially as specified.

56. The combination with the cam-bars, the variable links, the vibrating answer-arms 96, and means whereby the bars may move said links and position the links for answer-printing, substantially as specified.

57. The combination of the keys, the key-locking plates, and the cam-bars, with lever 70 and means whereby the lever may move both the plates and bars out of operating position during answer-printing, substantially as specified.

58. The combination with the canceling mechanism and the main power device, of means for preventing any operation of the canceling mechanism pending an operation of the power device, substantially as specified.

59. The combination with the canceling mechanism and the main power device of means for locking the former pending any operation of the power device, such locking means acting on the lever 124 of the canceling mechanism, substantially as specified.

60. The combination with the canceling mechanism and the lever controlling the answer-printing, of means whereby the setting of said lever for answer-printing causes the locking of the canceling mechanism pending the answer-printing operation, substantially as specified.

61. The combination of a denominational series of keys having bent ends, and a spring-pressed swinging plate acting to lock the keys in their depressed positions, said plate being swung by the keys as they are depressed and thus adapted to release any key previously depressed, and the longitudinally-movable cam-bar, also actuated by the keys and held in its adjusted positions by the locked keys, substantially as specified.

62. The combination of a denominational series of keys having bent ends, and a spring-pressed swinging plate acting to lock the keys in their depressed positions, said plate being swung by the keys as they are depressed and thus adapted to release any key previously depressed, an adjustable cam-bar positioned and held by the depressed keys, the column-actuator whose movements are regulated by the cam-bar, and means for operating the actuator, substantially as specified.

DORR E. FELT.

Witnesses:
EDWARD S. EVARTS,
H. M. MUNDAY.